(12) United States Patent
Strandemar (10) Patent No.: US 8,153,971 B2
(45) Date of Patent: Apr. 10, 2012

(54) CAMERA WITH TWO VISUAL IMAGING SUBSYSTEMS FOR DETERMINING PARALLAX AND FOR FOCUSING AN IR IMAGING SUBSYSTEM

(75) Inventor: Katrin Strandemar, Rimbo (SE)

(73) Assignee: Flir Systems AB, Rimbo (SE)

( * ) Notice: Subject to any disclaimer, the term of this patent is extended or adjusted under 35 U.S.C. 154(b) by 120 days.

(21) Appl. No.: 12/624,333

(22) Filed: Nov. 23, 2009

(65) Prior Publication Data

US 2011/0121178 A1    May 26, 2011

(51) Int. Cl.
*G02F 1/01* (2006.01)
(52) U.S. Cl. ........................................ 250/330
(58) Field of Classification Search ............. 250/330, 250/332, 334, 338.1, 339.01, 339.02, 339.05
See application file for complete search history.

(56) References Cited

U.S. PATENT DOCUMENTS

| | | | |
|---|---|---|---|
| 7,820,967 B2* | 10/2010 | DeMarco et al. | 250/330 |
| 2008/0099678 A1* | 5/2008 | Johnson et al. | 250/332 |
| 2009/0010635 A1 | 1/2009 | Strandemar et al. | |
| 2009/0050806 A1* | 2/2009 | Schmidt et al. | 250/332 |
| 2009/0302219 A1* | 12/2009 | Johnson et al. | 250/332 |

FOREIGN PATENT DOCUMENTS

WO    WO 2006060746 A2 *  6/2006

* cited by examiner

*Primary Examiner* — Mark R Gaworecki
(74) *Attorney, Agent, or Firm* — Haynes and Boone, LLP (57) ABSTRACT

A camera has an infrared ("IR") imaging subsystem that includes an IR detector. The camera also has a first and second visual imaging subsystem for generating a first visual image and a second visual image of an object in a scene. The first visual image and the second visual image have a parallax that is dependent on the distance to the object and based on a known parallax function. The camera also has a processor for determining the parallax between the first visual image and second visual images. The IR imaging subsystem may also include an IR optical element for focusing IR radiation on the IR detector. The IR optical element may be operable to focus the IR radiation on the IR detector based on the parallax between the first visual image and the second visual image.

38 Claims, 7 Drawing Sheets

CAMERA WITH TWO VISUAL IMAGING SUBSYSTEMS FOR DETERMINING PARALLAX AND FOR FOCUSING AN IR IMAGING SUBSYSTEM

BACKGROUND

1. Field

The present technology relates to a camera and in particular to a camera comprising both an IR imaging subsystem and a visual imaging subsystem. The present technology also relates to a method of focusing such a camera.

2. Related Art

A number of methods exist for focusing an IR camera. Focusing may be performed manually by adjusting the optics by hand. It may also be performed by automatic means by means of a focus motor based on some indication of object distance.

It is becoming more and more common that IR cameras, in addition to the IR imaging subsystem, also comprise a visual imaging subsystem. The provision of both an IR imaging subsystem and a visual imaging subsystem, among other things, allows for more sophisticated presentation of image data, in particular fused images, which means that part of the image is shown as IR data and the rest as visual image data. Various types of picture-in-picture techniques exist for creating fused images. Blending is another form of fusion and refers to presenting a value for each pixel based on both the IR data and the visual image data for that pixel.

Co-pending U.S. Ser. No. 11/773,982 discloses a method of focusing an IR camera part in a camera also comprising a visual imaging part, based on the focus distance determined on the basis of the parallax between the IR image and the visual image.

None of the known methods for focusing an IR camera enables a continuous adjustment of the focus. The focusing function is becoming more and more important because many other features, such as temperature measurements, fusion alignment and image quality, depend on having correct focus.

SUMMARY

Embodiments of the invention may increase the usability of a number of such functions as defined above for an IR camera.

An exemplary embodiment of the invention relates to a camera comprising an IR imaging subsystem for obtaining IR images, a first visual imaging subsystem and a second visual imaging subsystem, the first and second visual imaging subsystems being arranged such that images of an object taken by the first and second imaging subsystem respectively will have a known parallax function dependent on the distance to the object, and a processor arranged to determine a parallax between a first visual image of the object taken by the first visual imaging subsystem and a second visual image of the object taken by the second visual imaging subsystem.

The use of two visual imaging subsystems in one IR camera may enable or simplify a number of functions in the IR camera. Some examples will be given below.

The processor may also be arranged to determine a distance to the object based on the parallax.

According to an embodiment of the invention, the camera further comprises focus control means arranged to focus the IR imaging subsystem based on the parallax. The processor may also be arranged to calculate a focus distance based on the parallax and the control means is arranged to focus the IR imaging subsystem based on the focus distance. This enables a continuous automatic focusing of the IR imaging subsystem, since the calculations are independent of the IR imaging function and can be performed without interrupting the IR imaging functions. The actual focusing is performed by changing the relative position between the detector and at least one optical element. This may be done by moving either the detector, the at least one optical element or both. The focus distance may be based on the distance to the object.

Another exemplary embodiment is a computer-readable storage medium comprising computer executable instructions for obtaining a first visual image of an object using a first visual imaging subsystem of a camera, obtaining a second visual image of the object using a second visual imaging subsystem of the camera, determining an image parallax between the first and second visual image, and focusing an IR imaging subsystem based on the determined parallax.

DETAILED DESCRIPTION

Figure 1:
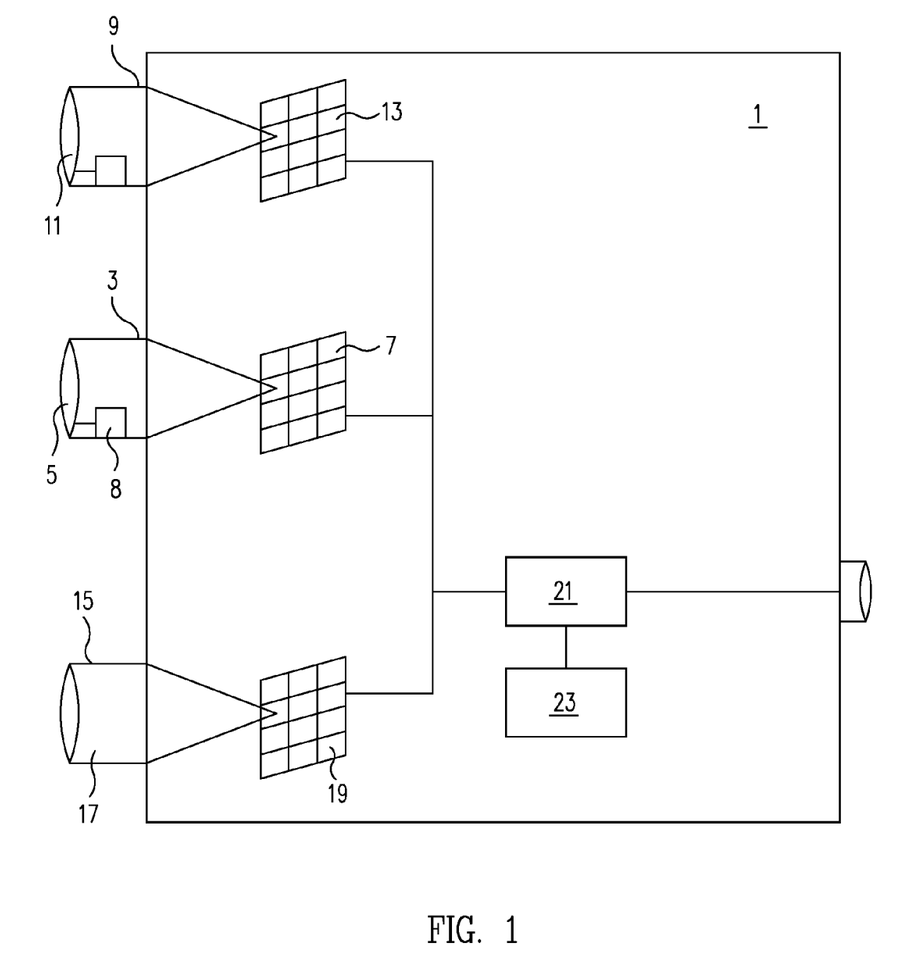
FIG. 1 illustrates a camera according to an exemplary embodiment.

FIG. 1 illustrates a camera 1 according to an exemplary embodiment of the invention. The camera comprises an IR imaging subsystem 3 that includes an IR detector 7 and IR optics 5 for focusing incoming radiation onto the IR detector 7. A focusing device for automatic focusing, such as a focus motor 8 is provided for the IR imaging subsystem 3. The camera also comprises a first visual imaging subsystem 9 having optics 11 for focusing incoming visual light onto a first visual light detector 13 in the camera and a second visual imaging subsystem 15 having optics 17 for focusing incoming visual light onto a second visual light detector 19 in the camera. The focusing of the optics is performed to ensure optimal focusing of the incoming radiation onto the detector, and may be performed manually or automatically by methods known in the art. Imaging subsystems having fixed focus are also known in the art and may also be used in this context.

The images detected by all three detectors 7, 13, 19 are fed to a processor 21. Typically the processor 21 performs some image processing as is known in the art. The processor 21 is further arranged to determine a parallax between the first and the second visual image based on at least part of the respective images. Of course, separate processors might be provided for performing different parts of the functionality if this is considered feasible. The operation of the processor may be controlled computer executable instructions. One or more memory units, here shown as one memory unit 23, are arranged in connection with the processor. The memory units 23 are used to store image data, but also to store computer executable instructions, tables, etc. to be used by the processor when performing the functions of the camera.

As will be discussed in the following, the parallax between the first and the second visual images is dependent on the distance to the object, and therefore also on the focusing distance of the imaging subsystems. Therefore, if the relationship between the parallax and the focusing distance, or the distance to the object, is known, the parallax between the two visual images can be used to determine the distance to the object. As will be understood, the parallax may differ for different parts of the images, if the distance to the imaged object or area varies within the image. The parallax may be determined for only one part of the image or independently for different parts of the image. If the parallax is determined for only one part of the image, this part can be determined in different ways. For example, the central portion of the image can be selected by default. Alternatively, the processor may be arranged to determine the most common object distance in the image based on the parallax. This may be done on a pixel-per-pixel basis or for groups of pixels. Alternatively, it may be possible for an operator to select a portion of the image for which the parallax should be determined, for example, the portion containing an object of interest.

If the parallax is to be determined for more than one portion this may be done in different ways, for example by dividing the first and second visual image into sub-images and determining the parallax separately for each sub-image as will be discussed in connection with FIG. 4.

Figure 2:
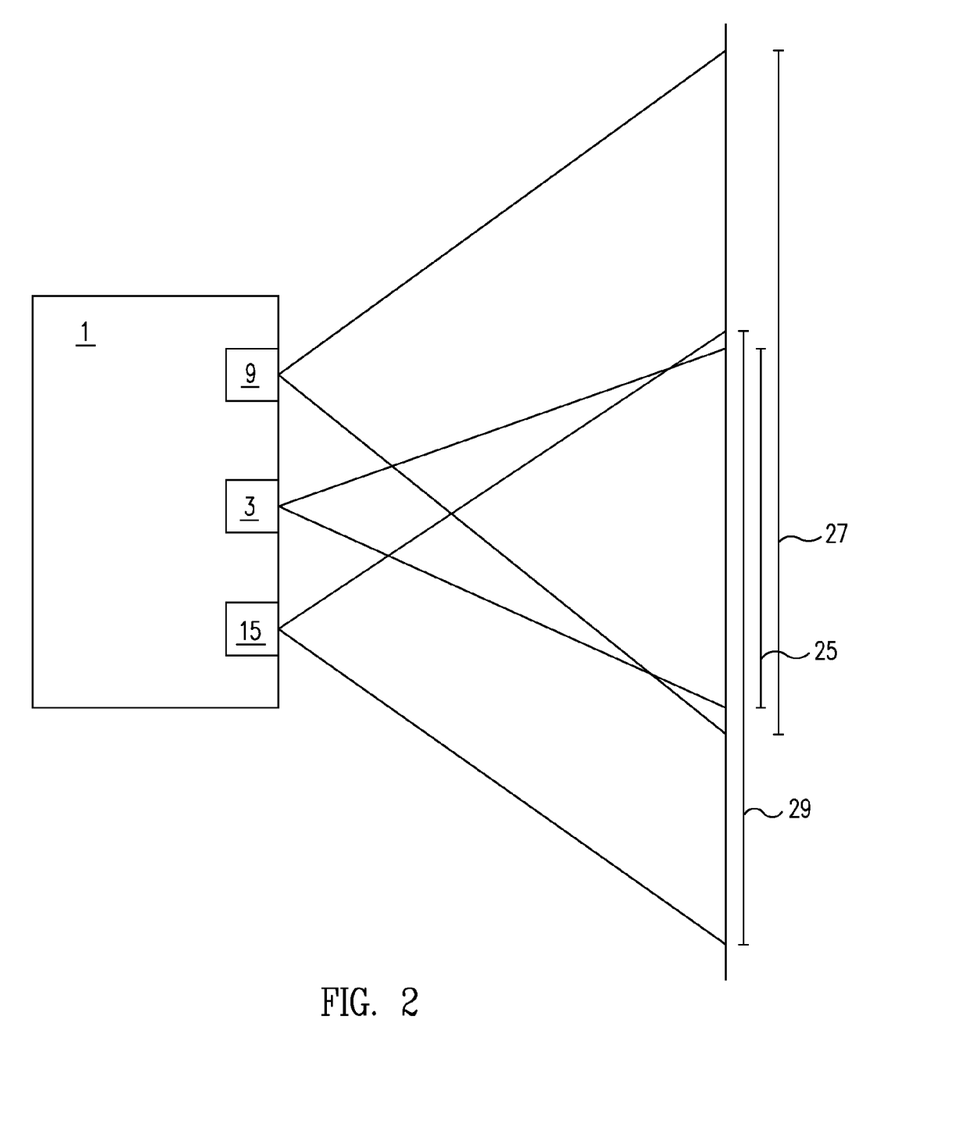
FIG. 2 illustrates the fields of view of the different imaging subsystems.

FIG. 2 illustrates the fields of view of the IR imaging subsystem 3 and the first and a second visual imaging subsystem 9, 15, respectively, of a camera such as the camera shown in FIG. 1. The three imaging subsystems are positioned in a fixed relationship to each other and images generated by the imaging subsystems therefore have a predetermined parallax between them. The IR imaging subsystem has a first IR field of view 25. The first visual imaging subsystem 9 has a first visual field of view 27, and the second visual imaging subsystem 15 has a second visual field of view 29.

In FIGS. 1 and 2, the three imaging subsystems 3, 9, 15 are shown positioned along a straight line, with the IR imaging subsystem 3 between the two visual imaging subsystems 9, 15. As will be understood, the imaging subsystems can be positioned relative to each other in any suitable way.

Two factors contribute to the relative displacement of the images: First, the distance between the imaging subsystems on the camera causes a displacement of the images that is constant in meters but decreases in number of pixels with increasing distance to the object. Second, the optical axes are normally not perfectly parallel. The angle between them causes a displacement that varies in meters with the distance to the object but is constant in number of pixels. The term parallax as used in this object includes the combined displacement caused by the distance between the imaging subsystems and the angle between the optical axes.

As seen in FIG. 2, the first visual imaging subsystem 9 has a first visual field of view 27 and the second visual imaging subsystem 15 has a second visual field of view 29. The first and second visual fields of view are partially overlapping and are displaced by a constant distance relative to each other, which constitutes the parallax. The IR imaging subsystem 3 has an IR field of view 25, which is typically narrower than the first and second visual fields of view. The parallax between the first and second visual fields of view can be used to determine the distance to the object. There is also a parallax between the IR field of view and each of the first and second fields of view, but these will not be discussed here. As shown in FIG. 2, the first and second visual fields of view 27, 29 may have a much greater angle than the IR field of view 25, so that each of the visual fields of view includes the full IR field of view.

Figure 3A:
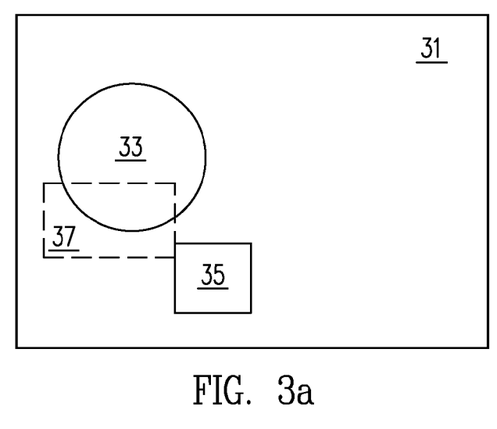
FIGS. 3a-3c illustrate the comparison of the two visual images.
Figure 3B:
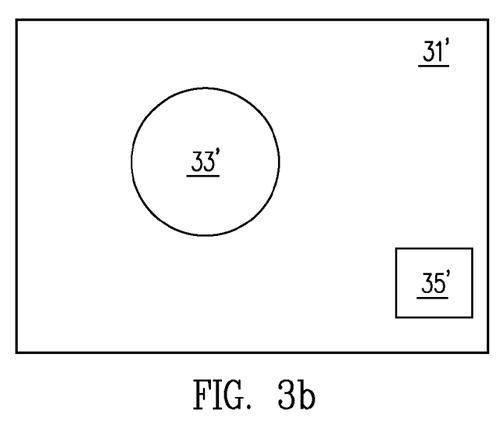

FIGS. 3*a* and 3*b* illustrate schematically a first visual image 33 taken by the first visual imaging subsystem and a second visual image taken 33' by the second visual imaging subsystem, respectively, of the same scene at the same time. The two images 33, 33' comprise essentially the same objects, but slightly shifted with respect to each other. The magnitude shift is dependent on the distance between the camera and the object in a way that may be obtained during calibration of the camera. For simplicity, the objects shown in the images are a circle 33 and a square 35, the circle is assumed to be farther away from the camera than the square. Therefore, the displacement of the square 35, 35' is greater than the displacement of the circle 33, 33' between the two images 31, 31'.

The direction of the shift is well-defined for each individual camera and is dependent on how the visual imaging subsystems are positioned relative to each other.

The shift between the first and second image may be determined in any suitable way. For example, a square such as the dashed square 37 shown in FIG. 3*a* may be defined in the first image and compared to corresponding areas in the second image in a suitable way. Assuming that the visual imaging subsystems 9, 15 are positioned on the same horizontal level, the images will be displaced in the horizontal direction, as shown in FIGS. 3*a* and 3*b*. In this case, one solution would be to slide the square horizontally across FIG. 3*b*, in other words, to compare it to squares on the same horizontal level to find the one whose values best match the ones in the square selected in the first image. The actual comparison may be made in any suitable way. A simple solution would be to subtract the images from each other and find the minimum of the match function. Alternatively, cross-correlation may be used. This would also provide a quality indicator.

The direction in which the square should be slid across the image depends, of course, on the direction in which the images will be displaced, which in turn depends on the orientation of the imaging subsystems relative to each other. In the example above, the displacement will be purely horizontal. In another configuration, the displacement may be only in the vertical direction. In that case, the square should slide vertically. If there is displacement in both the horizontal and the vertical direction, any direction that will capture a component of the displacement may be used. In general, if the magnitude of the displacement and the angle between the direction of displacement and the direction of sliding are known, the shift between the images can be determined.

Figure 3C:
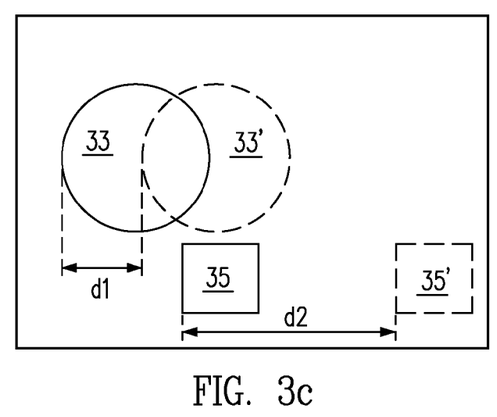

FIG. 3*c* shows FIG. 3*b* superimposed on FIG. 3*a*, only for illustration purposes. As can be seen, the circle 33' is displaced by a first distance d1 corresponding to a first number of pixels in the second image compared to the first image. The square 35' is displaced by a second distance d2 corresponding to a second number of pixels which is higher than the first number of pixels. The number of pixels in each case can be used to determine the distance to each of the objects. As will be understood, the displacement can be performed for only one object, or for any number of objects in the image. It is possible to create a distance map for all objects. In this context, all objects in the IR field of view are of interest. A distance map would enable focusing on each object in the image separately.

Figure 4:
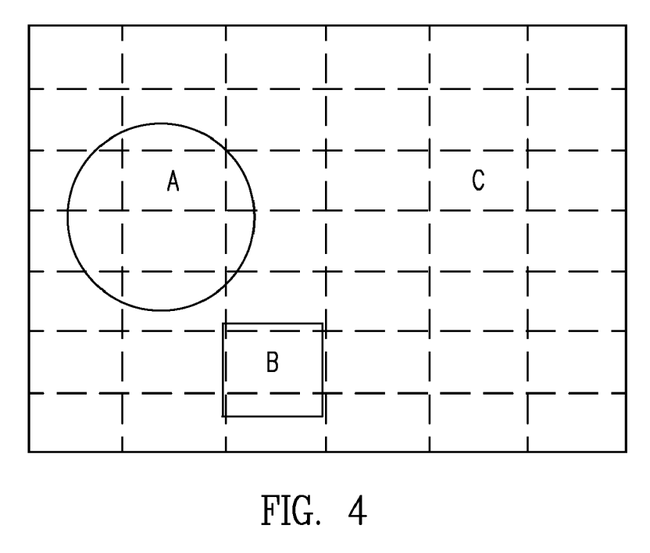
FIG. 4 illustrates a distance map for an image.

An example of a distance map is shown in FIG. 4. The distance map corresponds to the image shown in FIG. 3*a*. The image has been divided into smaller rectangular areas and the distance to the imaged scene in each of the squares is determined on the basis of the parallax between the first and second images in this square. For example, for the rectangle denoted A, the distance to the circle 33 will be determined. For the rectangle denoted B, the distance to the square 35 will be determined. For the rectangle denoted C, the distance to the background will be determined.

As can be seen in FIG. 4, in some cases the square will have pixels representing different object distances. This may be handled in several different ways. For example, the pixels in the portion of the square that has the best contrast may dominate.

To be able to use the parallax between the visual images in calculations to determine the distance to the object, the relationship between the parallax and the distance to the object must be determined during calibration. This calibration is performed individually for each camera to correct for the actual positioning of the imaging subsystems, which is subject to tolerances.

The relationship between the focusing distance dF and the distance z to the object is given by equation (1), which is well-known in the art.

$$dF = a/z + b \quad (1)$$

In Eq. (1),
a is a constant depending on the focal length of the optics, and b is a constant dependent on the focusing distance in the case of far focus.

The relationship between the parallax T and the object distance z is given by Eqs. (2) and (3):

$$Tx = ax/z + bx \quad (2)$$

$$Ty = ay/z + by \quad (3)$$

Here Tx indicates the horizontal displacement between the first and second visual light image and Ty indicates the vertical displacement. Constants ax, bx, ay and by represent the horizontal and vertical displacement, respectively.

The constants ax, bx, ay, and by are determined for each camera in calibration proceedings before delivery. How to do this is well known in the art. The distance z to the object can then be determined based on the parallax by one of the following equations (4) and (5), based on equations (2) and (3), respectively:

$$z = \frac{a}{T_x - b_x} \quad (4)$$

$$z = \frac{a}{T_y - b_y} \quad (5)$$

Figure 5:
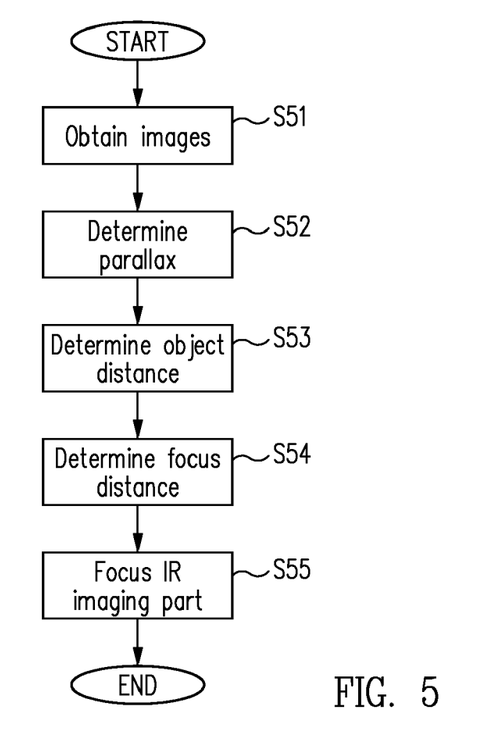
FIG. 5 is a flow chart of a method for focusing the IR imaging subsystem according to an exemplary embodiment of the invention.

FIG. 5 is a flow chart of the method according to an exemplary embodiment of the invention, in which the information is used to determine the focus distance in order to focus the IR imaging subsystem.

Step S51: obtain a first and second visual image
Step S52: determine the parallax between first and second visual image
Step S53: use the parallax to determine the distance to the object
Step S54: use distance to object to determine focus distance
Step S55: focus IR imaging subsystem based on focus distance Obtaining the first and second visual images in Step S51 may occur contemporaneously, e.g., at the same time or about the same time. Steps S52-S55 may be performed by a computer program stored in memory and run in the processor 21 of the IR camera.

As will be understood, the calculations in step S53-S55 can be combined so that in practice the focus distance is determined directly from the parallax. The calculations can be performed for one part of the image or for several parts of the image, as discussed above.

The information obtained from the two visual imaging subsystems of the exemplary embodiment can be used in a number of applications in addition to, or instead of the continuous autofocusing application discussed above.

For example, the information may be used to present information to the user about the distance to objects in different parts of the image. As above, the distance is calculated on the basis of the parallax between the first and second visual images in the area or the object of interest. The areas or objects may be selectable by the operator, or information may be presented related to a particular part of the image as a default. It would also be possible to present the most common distance, or an average value of all distances, calculated on pixel level or a suitable sub-image level. Alternatively, the distance information may be presented in a distance map as shown in FIG. 4.

In another exemplary embodiment, a camera having two visual imaging subsystems and an IR imaging subsystem may be used for perspective correction.

Figure 6A:
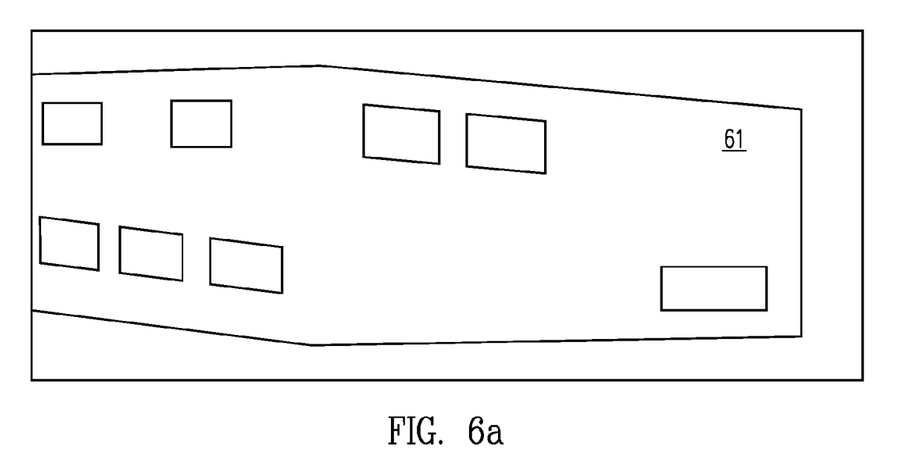
FIGS. 6a-6b illustrate the perspective effect and its correction, respectively

Perspective in images implies that an object will appear smaller in the image the farther away from the camera it is. In images of buildings, this means that walls can appear not to be parallel and that the building appears wider closer to the camera. Perspective effects are particularly pronounced in panorama images. FIG. 6a shows a schematic example of the perspective effect using a building 61 for illustration. As can be seen, the building clearly appears taller at the centre, which it is not.

In many cases it is desired to correct for the effects of perspective, so that for example buildings or other wide objects can be imaged with the correct proportions and so that lines that are parallel really appear as parallel in the image. Image processing software products often have some form of correction for perspective effects. However, for a perfect correction is it necessary to know the distance from the camera to the imaged object.

Figure 6B:
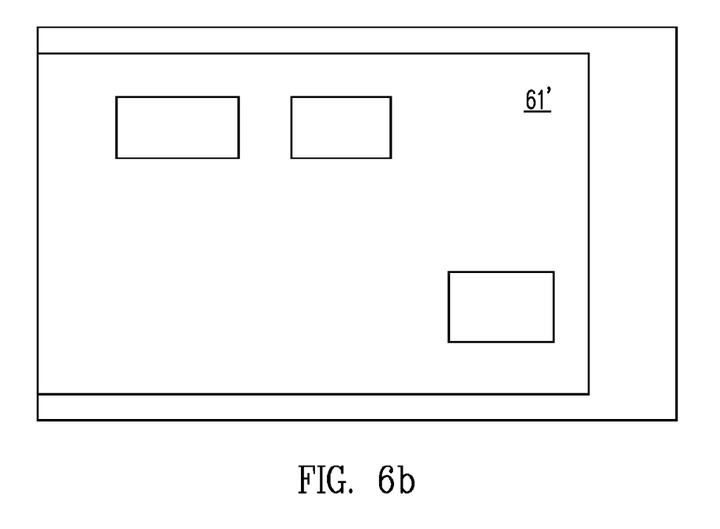

FIG. 6b shows the rightmost part of the same building after perspective correction. As can be seen, the lines of windows now appear straight and parallel and the building appears to be equally tall at all points.

According to this embodiment, therefore, a distance map such as the one described above in connection with FIG. 4 may be used to correct for perspective effects. As mentioned above, the size of the areas in the distance map should be selected in a suitable way to ensure smooth transition between objects at different distances. This means that the areas should not be too large.

Figure 7:
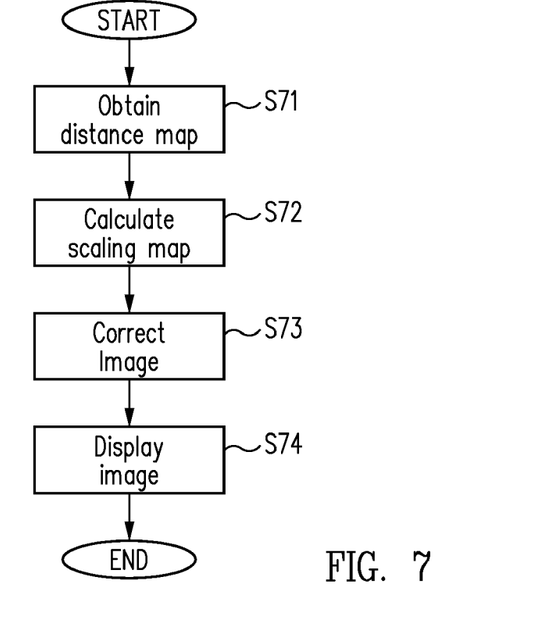
FIG. 7 is a flow chart of a method for correcting perspective according to an exemplary embodiment of the invention.

A method of correcting for perspective effects is shown in FIG. 7.

Step S71: Obtain a distance map for the imaged scene, as previously described.
Step S72: Calculate a scaling map based on the distance map. The scaling map has a scaling factor for each area of the scaling map. The scaling factors are inversely proportional to the distance values in the distance map.
Step S73: Apply the values of the scaling map to the corresponding parts of the image, to correct the image for the effects of perspective.
Step S74: Display the image as corrected in step S73.

In general the scaling factors are obtained by resampling from number of pixels to distance in meters. Since the detector has a total field of view, each pixel in the detector will have a pixel field of view that is the total field of view divided by the number of pixels in that dimension. To convert to meters the angle of the field of view and the distance to the object are needed.

Perspective effects are typically greater in panoramas of multiple images than in a single image because of the wider field of view in panorama images. In panorama image creation, the distance map can also be used to correct, at least partially, for the distortion caused by camera movement between image capture.

Once the distance to the object for each pixel, or group of pixels, has been determined, the actual size of an object, or an area in the image, can also be determined. As explained above, the distance to each object or area of the image may be determined in the form of a distance map. Again, the field of view of each pixel and the distance to the object together determine the size of the area covered by one pixel. Therefore, the size of an object may be determined by number of pixels covering the object and the distance to the object.

If the object is large and placed at an angle with respect to the camera, different parts of the object may be at different distances to the camera. In that case each pixel representing the object will not represent the same area. This may be taken into account by perspective correcting the image as discussed in connection with FIGS. 6a and 6b before calculating the area. Alternatively the average pixel size may be taken as the size of a pixel in the centre of the object, or as the average between pixels at the extreme ends of the object. This will be a fair approximation as long as the object has a regular shape such as a wall. More complex calculations may be performed, including determining the angle of the object relative to the camera based on the distance to different parts of the object.

The distance information can also be used to determine the parallax between the IR image and one of the visual images to enable fusion between the IR image and the visual image. In addition to the relationship between the parallax between the visual images and the distance to the object (or the focus distance) discussed above, this application requires information about the relationship between the parallax between the visual image and the IR image.

The distance-dependence of the parallax between the IR image and one of the visual images can be determined as discussed above with reference to Eqs. (1)-(6) above, applying the equations to the displacement between the IR imaging subsystem and the relevant visual imaging subsystem.

Figure 8:
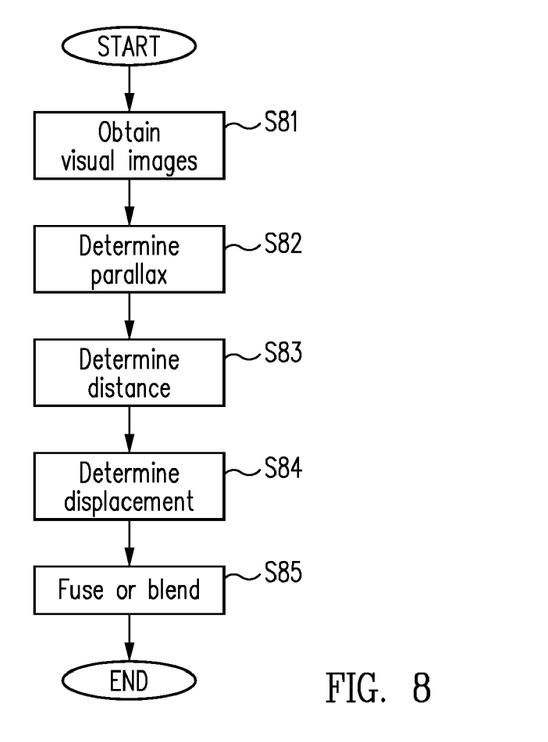
FIG. 8 is a flow chart of a method according to an exemplary embodiment of the invention.

FIG. 8 is a flow chart of the method according to an exemplary embodiment, in which the information is used for parallax correction when fusing or blending an IR image and a visual image.

Step S81: obtain first and second visual image
Step S82: determine the parallax between first and second visual image
Step S83: use the parallax to determine the distance to the object, or focus distance
Step S84: use distance to object to determine displacement between IR and visual image
Step S85: Fuse or blend the IR and visual image as desired using the determined displacement to align the images
Steps S82-S85 may be performed by a computer program stored in memory and run in the processor 21 of the IR camera.

Methods for aligning images for fusion based on the focus distance or object distance is well known in the art.

Another possible application would be to create a 3D image from the two visual images in a way known in the art, and to colour selected parts of the 3D image with IR information in a similar way to fusion. One way of describing this would be to start with the IR image and superimpose the distance map onto it. This would "raise" areas of the IR image to correspond to a 3D image with IR colouring. Alternatively it may be seen as projecting the IR image onto the distance map.

One additional field of application for the distance map would be to combine several images focused at different object distances into one image. A distance map could be created on the basis of one image and used to determine the relevant distances in the scene. In a simple case, there may be an object at a certain first distance, and a background at a second, greater distance. Once this had been determined, the necessary images could be obtained. In this example this would mean a first image focused at the first distance, and a second image could be obtained focused at the second distance. In the first image therefore, the object would be in focus and in the second image the background would be in focus. The two images could be combined so that the part of the first image representing the object and the part of the second image representing the background are merged to create a new image in which both the object and the background are in focus.

Which parts to use from each image can be determined from the distance map.

Figure 9:
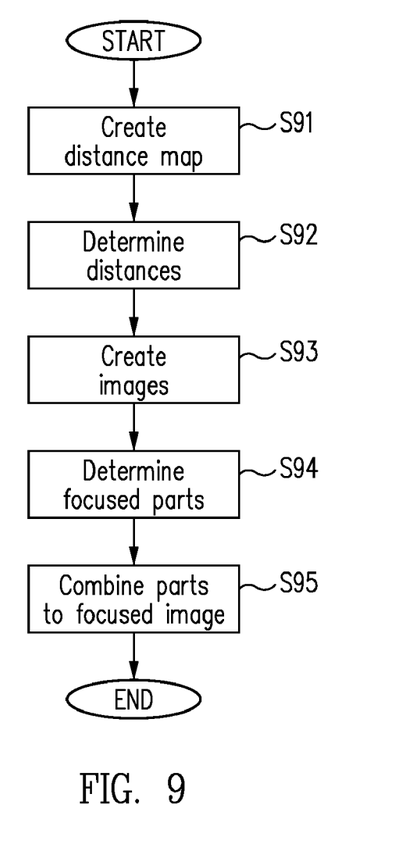
FIG. 9 shows a generalized method of determining which parts of each image to use when combining two images.

A generalized method is shown in FIG. 9

Step S91: Create distance map for a scene as discussed in connection with FIG. 4. Step S92: Determine the distances to the objects or areas that appear in the distance map. Step S93: For each of the distances determined in step S92, create an image of the scene focused on the distance. Step S94: For each of the images generated in step S93, determine which part or parts of the image are in focus, that is, the parts in which the object distance and the focus distance match. Step S95: combine the part or parts that are in focus from each image into one combined image. The combined image has the whole scene with every part of the image in focus.

Figure 10:
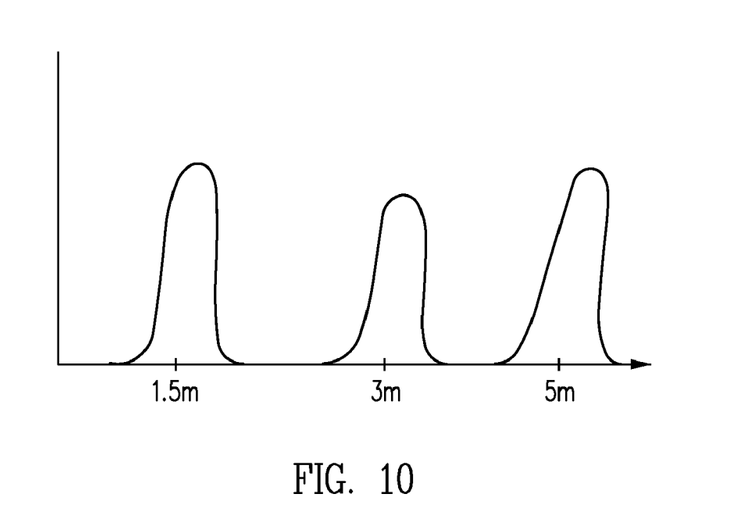
FIG. 10 is a histogram of the distances in an exemplary distance map.

FIG. 10 is a histogram of the distances in a distance map, for a scene in which one object appears at a distance of 1.5 m, one object appears at a distance of 3 meters and the background is constituted by a wall 5 meters away. In this case, therefore, three images should be taken, with focus distances of 1.5 m, 3 m and 5 m, respectively. For any object above a certain distance a far focus function could be used so that there would be no need to distinguish between objects at different distances above this certain distance.

The invention claimed is:

1. A camera, comprising:
an infrared ("IR") imaging subsystem configured to obtain IR images, the IR imaging subsystem having an IR detector;
a first visual imaging subsystem configured to obtain a first visual image of an object in a scene, the first visual imaging subsystem having a first visual light detector;
a second visual imaging subsystem configured to obtain a second visual image of an object in a scene, the second visual imaging subsystem having a second visual light detector, wherein the first and second visual images have a parallax, or displacement, dependent on the distance to the object and based on a known parallax function; and
a processor configured to determine the parallax, or displacement, between the first visual image of the object taken by the first visual imaging subsystem and the second visual image of the object taken by the second visual imaging subsystem, based on at least part of the first and second visual images.

2. The camera of claim 1, wherein the processor is further operable to determine a distance to the object based on the parallax, or displacement, between the first visual image and the second visual image.

3. The camera of claim 2, wherein the IR imaging subsystem further includes an IR optical element for focusing IR radiation on the IR detector based on the parallax.

4. The camera of claim 3, wherein the processor is further operable to calculate a focus distance based on the parallax and the IR optical element is operable to focus IR radiation on the IR detector based on the focus distance.

5. The camera of claim 4, wherein the processor is further operable to determine a displacement between an IR image taken by the IR imaging subsystem and the first visual image taken by the first visual imaging subsystem, align the IR image and the first visual image based on the displacement, and present at least one of a fused image or a blended image based on the IR image and the first visual image.

6. The camera of claim 3, wherein the processor is further operable to determine a displacement between an IR image taken by the IR imaging subsystem and the first visual image taken by the first visual imaging subsystem, align the IR image and the first visual image based on the displacement, and present at least one of a fused image or a blended image based on the IR image and the first visual image.

7. The camera of claim 2, wherein the processor is further operable to determine a displacement between an IR image taken by the IR imaging subsystem and the first visual image taken by the first visual imaging subsystem, aligning the IR image and the first visual image based on the displacement, and present at least one of a fused image or a blended image based on the IR image and the first visual image.

8. The camera of claim 7, wherein the processor is further operable to determine a first and a second displacement for at least a first and a second part of the IR image, respectively, and align the first and second part of the image based on the first and second displacement, respectively.

9. The camera of claim 1, wherein the IR imaging subsystem further includes an IR optical element for focusing IR radiation on the IR detector based on the parallax.

10. The camera of claim 9, wherein the processor is further operable to calculate a focus distance based on the parallax, and the IR optical element is operable to focus IR radiation on the IR detector based on the focus distance.

11. The camera of claim 10, wherein the processor is further operable to determine a displacement between an IR image taken by the IR imaging subsystem and the first visual image taken by the first visual imaging subsystem, align the IR image and the first visual image based on the displacement, and present at least one of a fused image or a blended image based on the IR image and the first visual image.

12. The camera of claim 9, wherein the processor is further operable to determine a displacement between an IR image taken by the IR imaging subsystem and the first visual image taken by the first visual imaging subsystem, align the IR image and the first visual image based on the displacement, and present at least one of a fused image or a blended image based on the IR image and the first visual image.

13. The camera of claim 1, wherein the processor is further operable to determine a displacement between an IR image taken by the IR imaging subsystem and the first visual image taken by the first visual imaging subsystem, align the IR image and the first visual image based on the displacement, and present at least one of a fused image or a blended image based on the IR image and the first visual image.

14. The camera of claim 1, wherein the processor is further operable to determine the parallax, or displacement, by comparing the first visual image and the second visual image to find corresponding areas.

15. The camera of claim 14, wherein the comparing the first visual image and the second visual image to find corresponding areas comprises subtracting the first visual image and the second visual image from each other and finding a minimum of a match function.

16. The camera of claim 14, wherein the comparing the first visual image and the second visual image to find corresponding areas comprises using cross-correlation.

17. A non-transitory computer-readable storage medium comprising computer executable instructions for:
    obtaining a first visual image of an object by focusing incoming visual light onto a first visual light detector;
    obtaining a second visual image of the object by focusing incoming visual light onto a second visual light detector; and
    determining an image parallax, or displacement, between the first and second visual images based respectively on at least part of the first and second visual images.

18. The non-transitory computer-readable storage medium of claim 17 further comprising computer executable instructions for:
    determining a distance to the object based on the parallax between the first visual image and the second visual image.

19. The non-transitory computer-readable storage medium of claim 17 further comprising computer executable instructions for:
    determining at least a first distance and a second distance to at least a first object and a second object in the scene.

20. The non-transitory computer-readable storage medium of claim 17 further comprising computer executable instructions for:
    calculating a focus distance based on the determined parallax; and
    focusing an IR imaging subsystem based on the focus distance.

21. The non-transitory computer-readable storage medium of claim 20, further comprising computer executable instructions for:
    determining a displacement between an IR image and a visual image from the first or second visual light detector;
    aligning the IR image and the visual image based on the displacement; and
    presenting at least one of a fused image or a blended image based on the IR image and the visual image.

22. The non-transitory computer-readable storage medium of claim 20 further comprising computer executable instructions for:
    determining a first and a second displacement for at least a first and a second part of an IR image, respectively; and
    aligning the first and second part of the IR image based on the first and second displacement, respectively.

23. The non-transitory computer-readable storage medium of claim 17 further comprising computer executable instructions for:
    determining a displacement between an IR image and a visual image from the first or second visual light detector;
    aligning the IR image and the visual image based on the displacement; and
    presenting at least one of a fused image or a blended image based on the IR image and the visual image.

24. The non-transitory computer-readable storage medium of claim 17 further comprising computer executable instructions for:
  determining a first and a second displacement for at least a first and second part of an IR image, respectively; and
  aligning the first and second part of the IR image based on the first and second displacement, respectively.

25. The non-transitory computer-readable storage medium of claim 17, wherein the determining the image parallax, or displacement, comprises comparing the first visual image and the second visual image to find corresponding areas.

26. The non-transitory computer-readable storage medium of claim 25, wherein the comparing the first visual image and the second visual image to find corresponding areas comprises subtracting the first visual image and the second visual image from each other and finding a minimum of a match function.

27. The non-transitory computer-readable storage medium of claim 25, wherein the comparing the first visual image and the second visual image to find corresponding areas comprises using cross-correlation.

28. A method of focusing a camera having an IR imaging subsystem and a first visual imaging subsystem having a first visual light detector and a second visual imaging subsystem having a second visual light detector, the method comprising:
  obtaining a first visual image of an object by focusing incoming visual light onto the first visual light detector;
  obtaining a second visual image of an object by focusing incoming visual light onto the second visual light detector; and
  determining an image parallax, or displacement, between the first and second visual images based respectively on at least part of the first and second visual images.

29. The method of claim 28, further comprising:
  calculating a focus distance based on the image parallax; and
  focusing the IR imaging subsystem based on the focus distance.

30. The method of claim 29, further comprising:
  for each of the first and second visual images respectively, selecting corresponding parts of the first and second visual images containing the object to be imaged; and
  detecting the image parallax between the first and the second visual image for each part of the object.

31. The method of claim 30, further comprising:
  determining a displacement between an IR image taken by the IR imaging subsystem and the first visual image taken by the first visual imaging subsystem;
  aligning the IR image and the first visual image based on the displacement; and
  presenting at least one of a fused image or a blended image based on the IR image and the first visual image.

32. The method of claim 29, further comprising:
  determining a displacement between an IR image taken by the IR imaging subsystem and the first visual image taken by the first visual imaging subsystem;
  aligning the IR image and the first visual image based on the displacement; and
  presenting at least one of a fused image or a blended image based on the IR image and the first visual image.

33. The method of claim 28, further comprising:
  for each of the first and second visual images respectively, selecting corresponding parts of the first and second visual images containing the object to be imaged; and
  detecting the image parallax between the first and second visual image for each part of the object.

34. The method of claim 33, further comprising:
  determining a displacement between an IR image taken by the IR imaging subsystem and the first visual image taken by the first visual imaging subsystem;
  aligning the IR image and the first visual image based on the displacement; and
  presenting at least one of a fused image or a blended image based on the IR image and the first visual image.

35. The method of claim 28, further comprising:
  determining a displacement between an IR image taken by the IR imaging subsystem and the first visual image taken by the first visual imaging subsystem;
  aligning the IR image and the first visual image based on the displacement; and
  presenting at least one of a fused image or a blended image based on the IR image and the first visual image.

36. The method of claim 28, wherein the image parallax, or displacement, is determined by comparing the first visual image and the second visual image to find corresponding areas.

37. The method of claim 36, wherein the comparing the first visual image and the second visual image to find corresponding areas comprises subtracting the first visual image and the second visual image from each other and finding a minimum of a match function.

38. The method of claim 36, wherein the comparing the first visual image and the second visual image to find corresponding areas comprises using cross-correlation.

* * * * *

UNITED STATES PATENT AND TRADEMARK OFFICE
CERTIFICATE OF CORRECTION

PATENT NO. : 8,153,971 B2  
APPLICATION NO. : 12/624333  
DATED : April 10, 2012  
INVENTOR(S) : Katrin Strandemar Page 1 of 1

It is certified that error appears in the above-identified patent and that said Letters Patent is hereby corrected as shown below:

On the title page, item (73) Assignee:

Change "Flir Systems AB, Rimbo (SE)" to --"FLIR Systems AB, Taby (SE)"--

Signed and Sealed this
Thirtieth Day of September, 2014

Michelle K. Lee
*Deputy Director of the United States Patent and Trademark Office*